United States Patent
To et al.

(10) Patent No.: US 6,644,591 B2
(45) Date of Patent: Nov. 11, 2003

(54) AERODYNAMIC SUPPLEMENTARY DEVICE FOR FLOAT AIRCRAFT

(75) Inventors: Frederick E. To, Northampton (GB); Res Kammer, Mirchel (CH)

(73) Assignee: Prospective Concepts AG, Zollikon (CH)

(*) Notice: Subject to any disclaimer, the term of this patent is extended or adjusted under 35 U.S.C. 154(b) by 0 days.

(21) Appl. No.: 10/031,816

(22) PCT Filed: Apr. 19, 2001

(86) PCT No.: PCT/CH01/00248
§ 371 (c)(1),
(2), (4) Date: Apr. 5, 2002

(87) PCT Pub. No.: WO01/92104
PCT Pub. Date: Dec. 6, 2001

(65) Prior Publication Data
US 2002/0113169 A1 Aug. 22, 2002

(30) Foreign Application Priority Data
May 31, 2000 (CH) .............................................. 1094/00

(51) Int. Cl.[7] .............................................. B64C 25/56
(52) U.S. Cl. .................................... 244/100 A; 244/105
(58) Field of Search ............. 244/100 A, 101, 244/105, 106; 114/283, 287, 292, 345

(56) References Cited
U.S. PATENT DOCUMENTS

| | | | |
|---|---|---|---|
| 2,228,860 A | 1/1941 | Von Schlippe | 244/105 |
| 2,375,973 A * | 5/1945 | Cooper et al. | 114/292 |
| 2,642,238 A | 6/1953 | McCarty, Jr. et al. | 244/101 |
| 3,190,587 A * | 6/1965 | Fries | 244/106 |
| 3,208,421 A * | 9/1965 | Landes et al. | 114/290 |
| 4,298,175 A * | 11/1981 | Earl | 244/13 |
| 4,697,762 A * | 10/1987 | Arney | 244/101 |
| 5,622,133 A * | 4/1997 | Sinitsyn et al. | 114/272 |
| 6,042,052 A | 3/2000 | Smith | 244/105 |

FOREIGN PATENT DOCUMENTS

| FR | 825 961 | 3/1938 |
|---|---|---|
| FR | 931 940 | 3/1948 |
| FR | 965 785 | 9/1950 |

* cited by examiner

Primary Examiner—Michael J. Carone
Assistant Examiner—Gabriel S. Sukman
(74) Attorney, Agent, or Firm—Jenkens & Gilchrist, P.C.

(57) ABSTRACT

The additional device according to the invention for floats for seaplanes and floatplanes comprises four airtight bladders (10) to which compressed air can be applied, and which extend along the float and rest on side surfaces (11) of the float, which essentially consists of a box (1). The bladders (10) are composed of a flexible material with little expansion capability or an elastomer material, and are entirely covered with an elastic and watertight textile skin (9). In the state when compressed air is applied, the edges of the box (1), that is to say the side edges (8) and the keel edge (7), are smoothed. Thus, as soon as the aircraft has become airborne, the drag coefficient $c_D$ of the float can be considerably reduced. The compressed air is released for the aircraft to land on and take off from water, so that the edges (7, 8) can produce their effect for directional stability (keel edge (7)) and in order to prevent the Coanda effect (side edges 8)).

19 Claims, 3 Drawing Sheets

AERODYNAMIC SUPPLEMENTARY DEVICE FOR FLOAT AIRCRAFT

Figure 1:
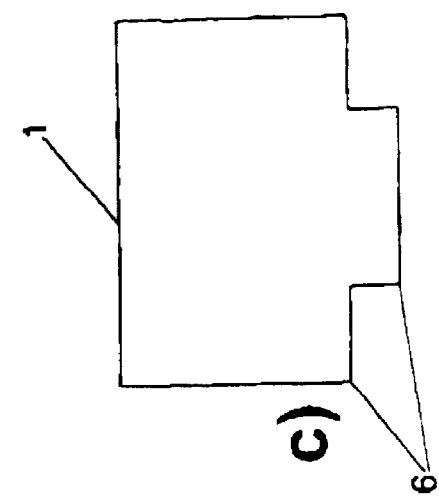
Figure 1:
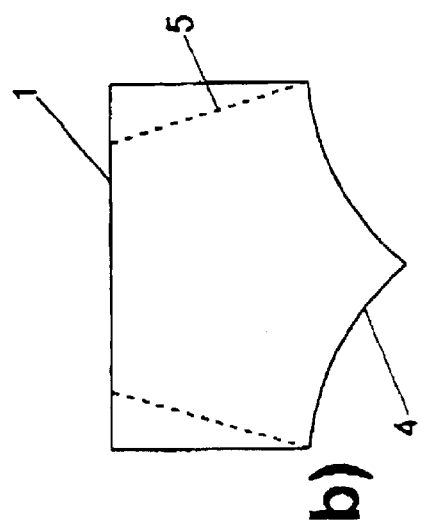
Figure 1:
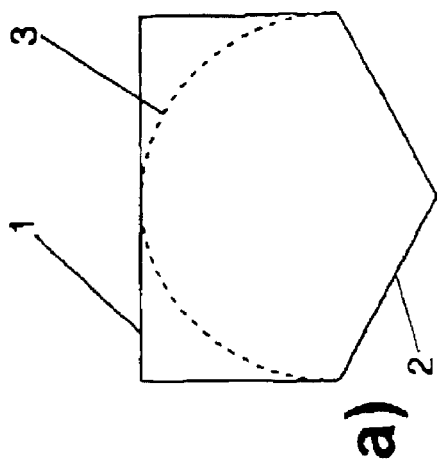

The present invention relates to an additional device for seaplanes and floatplanes according to the precharacterizing clause of Patent claim 1. Fluid-dynamic compromises have to be made with regard to the parts of flying boats, seaplanes, floatplanes and land aircraft provided with floats which are located in the water during take-off and landing; in order to avoid lengthy circumlocutions in each case, these parts will be referred to as floats from now on. Said compromises are based on the following considerations and requirements:

- floats are intended to give the aircraft good directional stability on water,
- floats should be able to change easily from being pure buoyancy floats to the sliding phase,
- floats should have as little drag in air ($c_D$) as possible.

Technical measures which take account in particular of the first two—hydrodynamic—requirements generally make the $c_D$ value worse, while those which improve the $c_D$ value generally destroy the buoyancy and sliding capability.

The Coanda effect (Henri Coanda 1886–1972) plays a central role here: on the basis of the continuity law, water flows around curved surfaces on a body and, in the process, its speed is increased resulting, according to Bernoulli's Law, in a pressure drop under water. Thus, if a float has a dynamically advantageous shape, then this pressure drop results in it normally being drawn into the water, rendering a sliding phase largely impossible, both during take-off and during landing on water.

In contrast, if a float is provided with, for example, a V-shaped lower surface, with a sharp-edged transition into vertical walls, that is to say with a sharp bilge edge, this not only improves the directional stability, but also largely suppresses the Coanda effect. However, this is invariably at the expense of the $c_D$ being increased by several times. The compromise to be reached between hydrodynamic and aerodynamic maximization generally therefore needs to be made in favour of hydrodynamics.

This applies in particular to the step or the step-shaped edge on the bottom of the float in virtually all known embodiments: this is hydrodynamically necessary in order to make the water flow turbulent and to allow air to flow in; however, it is aerodynamically disastrous since it likewise produces flow separation, but in this case this is undesirable.

The previously known attempts to overcome this poor compromise are not very numerous:

- either the edge—in plan view—is rounded at the rear
- or an arrangement of moving flaps has been proposed which are extended in flight and in the process cover the step-shaped edge, in order to improve the aerodynamic aspect, for example in DE 38 41 878 A1.

The object of the present invention is now to provide a supplement for hydrodynamically optimized floats, which allows the $c_D$ of such floats to be improved to a major extent when the aircraft is airborne. A further object is to design such a supplement such that it is light and such that all the components which are subject to wear are easily replaceable. The way in which said object is achieved is described in the characterizing part of claim 1, with regard to the main features of the invention, and in the following claims with regard to further advantageous embodiments.

Figure 2:
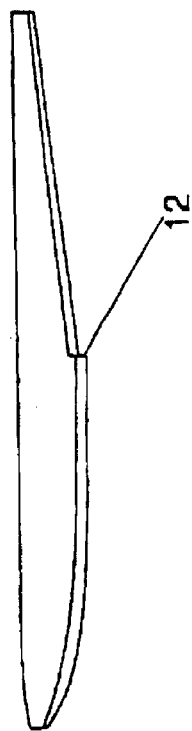
Figure 3:
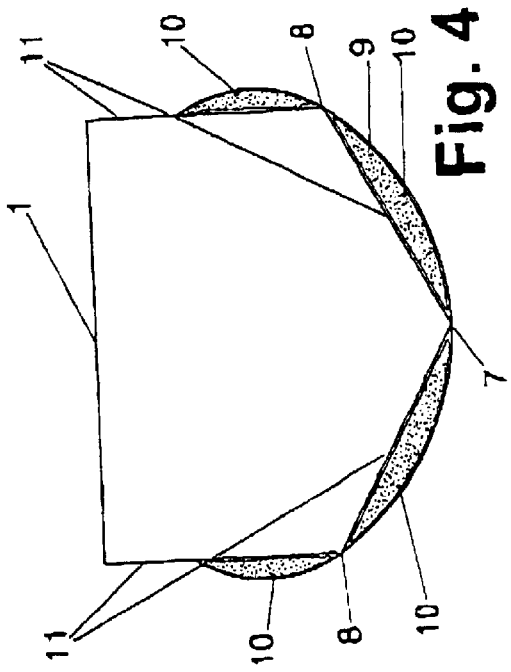
Figure 4:
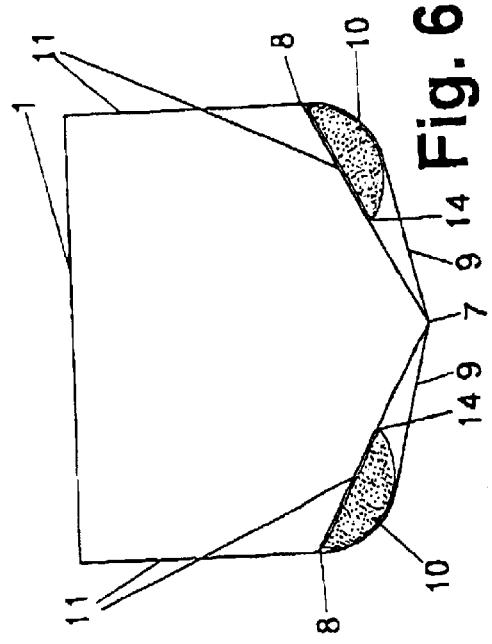
Figure 5:
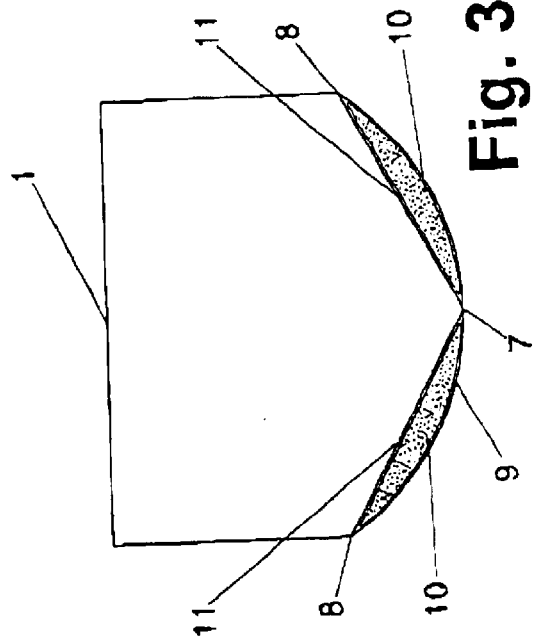
Figure 6:
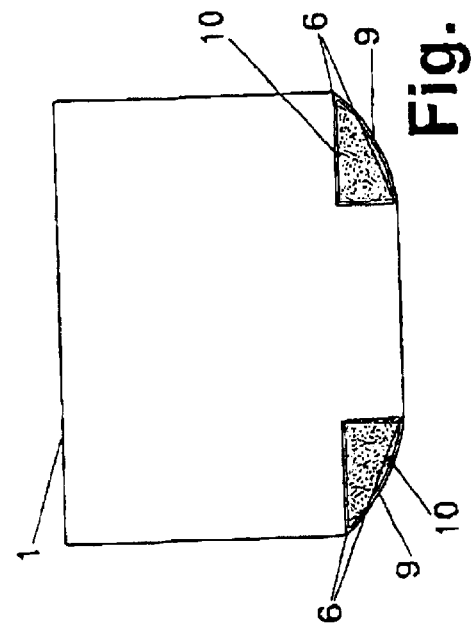
Figure 7:
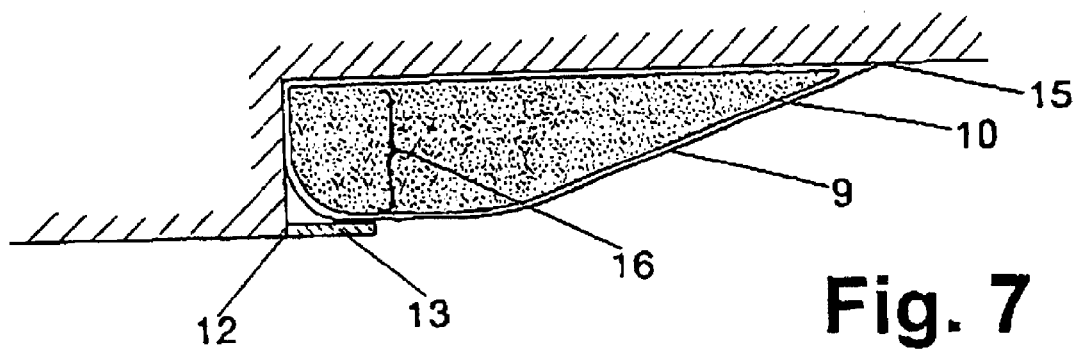
Figure 8:
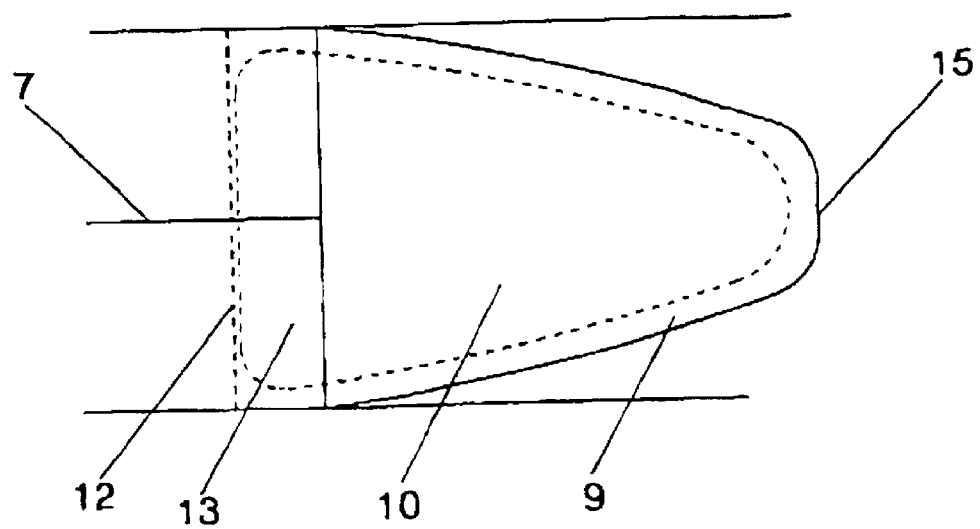

The attached drawing shows the idea of the invention with reference to a number of exemplary embodiments. In the figures:

FIGS. 1a, b, c show three cross-sectional float shapes which are known from the prior art, FIG. 2 shows a side view of the known float from FIG. 1a, FIG. 3 shows a first exemplary embodiment of a supplement according to the invention with reference to FIG. 1a, in the form of a cross section, FIG. 4 shows a second exemplary embodiment of a supplement according to the invention with reference to FIG. 1a, in the form of a cross section, FIG. 5 shows a third exemplary embodiment of a supplement according to the invention with reference to FIG. 1c, in the form of a cross section, FIG. 6 shows a fourth exemplary embodiment of a supplement according to the invention with reference to FIG. 1a, in the form of a cross section, FIG. 7 shows a fifth exemplary embodiment of a supplement according to the invention with reference to FIG. 2, in the form of a longitudinal section, and FIG. 8 shows a plan view of the example in FIG. 7, from underneath.

FIGS. 1a,b,c show three floats in the form of a cross section, such as those which are known as examples of the prior art.

FIG. 1a illustrates one frequently used profile: an essentially rectangular box 1 has an inverted roof-shaped profile 2 underneath; the transition to the vertical is formed with a sharp edge, in order to suppress the Coanda effect. The dashed line shows a round profile 3 which is used as an alternative to the box 1 and which improves the aerodynamic characteristics.

FIG. 1b differs from FIG. 1a in that the roof-shaped profile 2 is in the form of a hollow keel 4, which results in improvements in terms of water spray, directional stability and sliding characteristics, but obviously, in contrast, results in an aerodynamic deterioration. The dashed lines once again show a variant 5 of the box 1 which tapers upwards.

FIG. 1c shows what is referred to as the Dornier profile, which has good directional stability and sliding characteristics and is likewise optimized for water spray, but is regarded as being rather poor aerodynamically, because there are two edges 6 on each side.

The side view in FIG. 2 clearly shows an edge 12, which is always provided, irrespective of the choice of the cross-sectional profile shown in FIGS. 1a,b,c. As already indicated, the object of the edge 12 is to cause flow separation in water, which is the only way in which the aircraft can lift itself off the water at all. However, it likewise results in flow separation in air, and this results in a greatly increased drag coefficient $c_D$. Depending on whether the float under consideration is the fuselage of a flying boat or the floats of a seaplane or floatplane, the $c_D$ increase may be from 20% up to several times that of the float under consideration. The idea of the invention will be explained in more detail with reference to a number of exemplary embodiments, and based on FIGS. 3 to 8: virtually without exception, the floats are nowadays manufactured from hard materials, such as metal and/or plastics. It is thus fundamental to the invention to provide a supplement which, if need be, be fitted retrospectively and is composed of pneumatic elements whose shape can be varied by applying compressed air and can be predetermined by material selection and cutting to size.

FIG. 3 shows a cross section of such a supplement according to the invention, as can be fitted to a float as shown in FIG. 1a. The roof-shaped profile 2 has two surfaces 11 and three edges 7, 8: one keel edge 7 and two side edges 8. The roof-shaped profile 2 is covered with a textile skin 9 which can expand, is coated such that it is watertight and is attached to the float in the region of the edges 7, 8. Flexible bladders 10, running along the float, are inserted between the surfaces 11 of the profile 2 and the textile skin 9, and can have compressed air applied to them—via valves which are not shown here. The bottom of the float then assumes a curved shape, preferably a shape in which the surface transitions between the bottom and the walls of the box 1 run smoothly, and the transition from the rounded shape of one bladder 10 to the other likewise runs smoothly. However, the side edges 8 are at least weakened, both in their geometry and in their aerodynamic effect. This can be achieved firstly by the flexible material from which the bladders 10 are made being a textile material which has little expansion capability and is coated such that it is airtight, and secondly by the bladders 10 being manufactured from an elastomer and the extent of the curvature being set correctly in conjunction with the air pressure in the bladders 10, on the one hand, and the stresses originating from the elasticities of the skin 9 and bladders 10. The first-mentioned variant has the advantage that the desired shape is achieved above a specific air pressure; if the air pressure is increased further, the shape of the bladder 10 scarcely changes any further, provided the bladder 10 is, for example, bonded to the surfaces 11 of the profile 2, at least in the region of the edges 7, 8, over the entire length of the bladders 10. Different forms of connection in the form of a line or surface are, of course, likewise included within the idea of the invention.

FIG. 4 shows a further embodiment of the idea of the invention. In this case, the float has four bladders 10 running over at least a major proportion of its length. The construction, the material and the attachment of the bladders 10 correspond to what has been stated with regard to the bladders 10 in FIG. 3. The bladders 10 which are additional to those shown in FIG. 3 rest on the side surfaces 11, which likewise have the number 11. The use of four bladders makes it possible to produce smooth surface transitions over the edges 7, 8, with less deformation of the elastic skin 9. If a float with the variant 5 of the box 1 illustrated in FIG. 1b is used, in which the side surfaces 11 taper inwards in the upward direction and the surfaces 11 are in the form of hollow keels 4, then the exemplary embodiment shown in FIG. 4 is preferred.

FIG. 5 illustrates an exemplary embodiment of the idea of the invention with a Dornier profile as shown in FIG. 1c. In this case as well, two bladders 10 can be provided, as shown, or else four as shown in FIG. 4. The essential features are the smooth transitions of the skin 9 over the edges, which are anotated by the number 6 here, or—as already stated—with them at least being weakened.

FIG. 6 illustrates a fourth exemplary embodiment of the idea of the invention, in this case, by way of example, showing a cross-sectional profile corresponding to FIG. 1a. The longitudinally running bladders 10 used here cover the two side surfaces 11 only partially: in each case from the side edge 8 to a longitudinal line 14 (which appears as a dot here). In this area, the bladders 10 are bonded to the side surfaces 11 either over their complete area or else, for example, in the form of a line. The entire lower surface of the float, a cross section of which is illustrated here, is covered with the elastic textile skin 9. When compressed air is applied to the two bladders 10, the skin 9 now touches the float only in the areas of the keel edge 7 and of the side edges 8 where it is also attached. Thus, with this exemplary embodiment, it is possible to replace the side edges 8 by a smooth transition.

FIG. 7 is a detailed illustration of the transversely running edge 12 shown in FIG. 2. This edge 12, followed in the aft direction by a step 16, is required for hydrodynamic purposes since the water flow separates here and allows the float to slide—both during the take-off and landing phases. Aerodynamically, that is to say as soon as the aircraft is airborne, the edge 12 has an extremely disturbing effect, as already stated. FIG. 7 thus illustrates how this disturbing effect is overcome, or at least considerably reduced, according to the invention: the supplement according to the invention thus also includes an extension 13, corresponding to the cross-sectional profile, of the edge 12. When the bladder 10 is not inflated, the elastic skin 9 forces it essentially behind the extension 13 into the step 16. In this case as well, the bladder 10 is, of course, bonded to the float, for example, at least along the boundary of its contact surface with the float. In the state when compressed air is applied, it assumes the shape shown in FIG. 7, once again resulting in a smooth transition between the surface of the float forward of the edge 12 and that aft of it. The transition from said surface to the skin 9 covered by the bladder 10 is also smooth. This prevents flow separation in the air flowing around the float.

The extension 13 of the edge 12 is preferably attached to the float by bonding, with the extension being appropriately shaped and prepared for this purpose. Such bonding is, in contrast, prior art and therefore does not need to be described here. Depending on the configuration of the float, it may be advantageous to provide two bladders 10 filling the step 16 rather than one bladder 10; for example when using a Dornier profile.

FIG. 8 shows a plan view, from underneath, of the subject matter of FIG. 7 using only one bladder 10. The dashed line shows, firstly, the edge 12 which now projects from the extension 13 and, secondly, the boundary of the bonding of the bladder 10. If the aim is to fill only the step 16 by a bladder 10 with an elastic skin 9, the elastic skin 9 is drawn over the bladder 10 to such an extent that a secure connection—for example by bonding—to the lower surface of the float can be produced, and then has an edge 15. However, if it is also intended to carry out the smoothing of the other edges 6, 7, 8 according to the invention, the elastic skin 9 preferably covers at least the entire lower surface of the float.

The lines for the compressed air are not shown, since they are known per se. They are preferably routed in the interior of the float.

In order to deflate the bladders 10 quickly, vacuum lines can also be routed to the bladders 10, so that they can be pumped out before landing. However, the lines which are used for the compressed air can also be used for this purpose by providing valves which are known per se and provided a vacuum pump is present.

The supplement according to the invention may be of modular form, can be matched to the most usual types of and sizes of floats, may include only the smoothing of the edge 12, but may also include the smoothing of all the edges 6, 7, 8.

Its use is particularly advantageous for floats on low-performance aircraft such as light aircraft and ultralights, where the influence of the $c_D$ values of the floats being improved in this way is noticeable.

What is claimed is:

1. A pneumatic device adapted to be attached to a float of an aircraft, the pneumatic device comprising:
    at least one flexible airtight bladder arranged on the float, the at least one flexible airtight bladder being adapted to have compressed air applied thereto and comprising a flexible textile material having little elasticity;
    at least one watertight elastic skin covering the at least one flexible airtight bladder and bonded, at least in part, to the float; and wherein application of compressed air to the at least one flexible airtight bladder causes smoothing of at least one surface transition in a region of at least one edge of the float that can lead to flow separation in the air.

2. The pneumatic device of claim 1, wherein:
the float comprises:
   a V-shaped profile cross section in a part thereof that enters the water;
   a keel edge;
   two side edges; and
   surfaces between the keel edge and the two side edges and adjacent thereto; and
the at least one flexible airtight bladder runs along the float, is covered with the elastic textile skin, and rests on the surfaces.

3. The pneumatic device of claim 2, wherein the float has a bladder only on surfaces located between the keel edge and at least one side edge of the two side edges.

4. The pneumatic device of claim 3, wherein the at least one bladder covers the entire surfaces.

5. The pneumatic device of claim 3, wherein the at least one bladder covers only a part of the surfaces adjacent to the side edges and is bounded by a line running along the surfaces.

6. The pneumatic device of claim 2, wherein the float has a bladder both on surfaces located between the edges and on surfaces adjacent to the edges.

7. The pneumatic device of claim 2, wherein the at least one bladder is arranged only forward of a transversely running edge of the float.

8. The pneumatic device of claim 2, wherein the at least one bladder is arranged both forward of and aft of a transversely running edge of the float.

9. The pneumatic device of claim 1, wherein:
the float has a Dornier profile cross section with four edges;
the at least one bladder:
   runs along the float;
   is covered with the watertight elastic skin; and
   is arranged such that the at least one bladder is located between two edges of the four edges.

10. The pneumatic device of claim 9, wherein the at least one bladder is arranged only forward of a transversely running edge of the float.

11. The pneumatic device of claim 9, wherein at least one bladder of the at least one bladder is arranged forward of a transversely running edge of the float and at least one bladder of the at least bladder is arranged aft of a transversely running edge of the float.

12. The pneumatic device of claim 1, wherein:
at least one bladder of the at least one bladder is provided immediately aft of a transversely running edge of the float and is covered with the watertight elastic skin;
the transversely running edge has an extension projecting thereover and is attached to a forward part of the float;
the at least one bladder of the at least one bladder is shaped and dimensioned such that, when compressed air is applied thereto, the at least one bladder of the at least one bladder can compensate for a step produced by the transversely running edge.

13. The pneumatic device of claim 1, wherein compressed air lines are provided, each of the at least one bladder being connected to a compressed air line.

14. A The pneumatic device of claim 1, wherein the at least one bladder is adapted to be evacuated.

15. The pneumatic device of claim 14, wherein vacuum lines are provided and each of the at least one bladder is connected to a vacuum line.

16. The pneumatic device of claim 13, wherein vacuum lines are provided and each of the at least one bladder is connected to a vacuum line.

17. The pneumatic device of claim 16, wherein valves with a controller are provided and the compressed air lines and the vacuum lines are identical, the lines being operated by controlling the valves.

18. The pneumatic device of claim 15, wherein compressed air lines are provided, each of the at least one bladder being connected to a compressed air line.

19. The pneumatic device of claim 18, wherein valves with a controller are provided and the compressed air lines and the vacuum lines are identical, the lines being operated by controlling the valves.

* * * * *

UNITED STATES PATENT AND TRADEMARK OFFICE
CERTIFICATE OF CORRECTION

PATENT NO.      : 6,644,591 B2
DATED           : November 11, 2003
INVENTOR(S)     : Frederick E. To and Res Kammer It is certified that error appears in the above-identified patent and that said Letters Patent is hereby corrected as shown below:

Column 6,
Line 7, insert -- one -- after "least".

Signed and Sealed this

Eighteenth Day of October, 2005

JON W. DUDAS
*Director of the United States Patent and Trademark Office*